July 16, 1963    P. PIOT ETAL    3,098,148
PROCESS AND APPARATUS FOR PRODUCING PERFORATIONS
OF VERY SMALL CROSS-SECTION
Filed March 4, 1960

INVENTORS
PAUL PIOT
JACQUES BARASSIN

BY Albert L. Krey
ATTORNEY

United States Patent Office 3,098,148
Patented July 16, 1963

3,098,148
PROCESS AND APPARATUS FOR PRODUCING PERFORATIONS OF VERY SMALL CROSS-SECTION
Paul Piot, Deuil La Barre, and Jacques Barassin, Paris, France, assignors to Compagnie de Saint-Gobain, Neuilly-sur-Seine, France, a corporation of France
Filed Mar. 4, 1960, Ser. No. 12,719
Claims priority, application France Mar. 9, 1959
7 Claims. (Cl. 219—69)

The present invention relates to a process and apparatus for producing perforations of very small cross-section in metallic parts, particularly circular perforations of a diameter in the vicinity of a millimeter or smaller, and more particularly to the simultaneous production of a plurality of such perforations.

In particular, the invention is concerned with the production of circular perforations of very small diameter in a metallic wall, so as to form extrusion orifices for the production of filaments and fibers of plastic materials. It is applicable advantageously to the attainment of small-diameter perforations in annular bands designed to form the peripheral parts of centrifuge bodies which are suitable for the production of such filaments or fibers by the projection of the plastic material through these orifices.

The process according to the invention utilizes the working process known as "electric spark discharge," and which consists in making electric sparks flash between an electrode and the metallic workpiece, said electrode and said piece being immersed in an appropriate liquid. These sparks cause the production of the perforations through the piece.

The application of this process by sparking to the production of very small orifices presents a certain number of difficulties. In fact, while in the usual applications the manufacturing mill waste is easily eliminated, in the case of perforations of very small diameter, the accumulation of this waste in the bottom of the cavity presents considerable difficulty for the penetration of the electrode of very small diameter which is used. In the case where it is desired to obtain a plurality of orifices simultaneously, by means of several electrodes fixed to the same framework, this difficulty involves such disadvantages as to render the process useless. In fact, due to the irregular elimination of this waste, the penetration of the electrodes into the metal is irregular, and the electrodes having traversed the piece, work as drills, which brings about their deformation and makes them unfit for any further use, while the other orifices have not yet been entirely perforated.

The process according to the invention serves to eliminate these difficulties, and gives rise to the simultaneous production of a plurality of orifices of very small and very uniform diameter, without abnormal wear on the electrodes, and which allows the electrodes to be utilized for a large number of operations.

This process consists of attaining a simultaneous progression of electrodes through the piece to be perforated in such a way, that the blind holes which are formed have at every instant practically the same length and the same diameter. The progression of the electrodes is stopped before any of them have pierced the piece, which is followed by machining the surface opposite to that through which the electrodes were introduced, this opration being carried up to the opening or clearing of all the blind holes made by the electrodes.

It is advantageous, and this is another characteristic of the invention, to disengage the electrodes periodically during the course of work, in order to permit intermittent introduction of liquid into the cavities which are formed, the liquid carrying off in certain measure the wastes of the work.

The process according to the invention may be utilized to obtain perforations in plates of any form, whether plane or curved, particularly, as indicated below, in circular bands designed for centrifuge bodies designed to produce thermoplastic fibers, particularly glass fibers.

A device according to the invention for perforating such bands is described in the following by way of example, and not by way of limitation.

In this description, reference is made to the attached drawings wherein—

Figure 1:
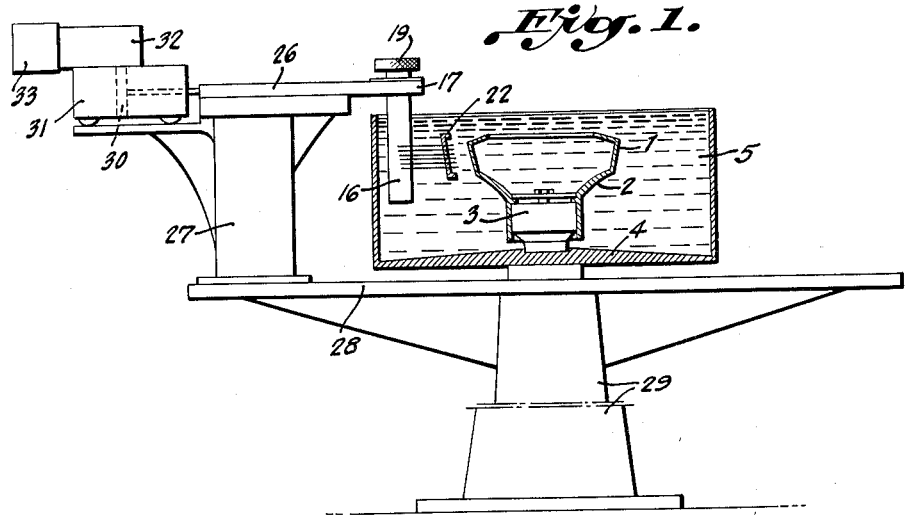
FIG. 1 is a front elevation of the assembly, with certain parts in section.
Figure 2:
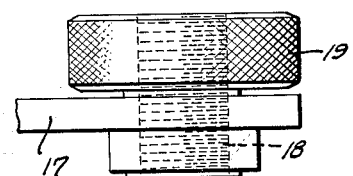
FIG. 2 is a detailed view of a portion of FIG. 1 on an enlarged scale.

In the illustrated embodiment of the invention, the apparatus is designed to pierce orifices in the peripheral band or wall 1 of a centrifuge body 2. The latter is attached by a clamping piece 6 to support 3, which is mounted on the bottom 4 of a vat 5 along the axis of the latter. The vat is adapted to be filled with a dielectric liquid. As is shown in the drawing, the centrifuge body 2 is mounted with its bottom 12 facing toward the top.

In addition, a crown 7 is attached adjacent to the peripheral wall 1 and parallel thereto. This attachment is effected in the illustrated embodiment by means of threaded bolts 9 screwing onto an annular part 8 resting on the periphery of the bottom 12 of the centrifuge body. This annular part 8 is itself fastened by screw-threaded bolts 10 to hoops or a crown wheel 11 resting on the interior of the centrifuge body.

Crown wheel 7 is provided with parallel passages 13, equal in number to the electrodes which are used, and the inlet openings of which are conical. A circular shoulder 14 is formed in the upper external part of crown 7. There is provided between the crown wheel 7 and the exterior wall of the band 1 a space 20, which is open at the lower part, and which communicates at its upper part with channels 25 provided in the annular part 8. The resulting free passages allow the dielectric fluid to bubble through.

Electrodes 15, equal in number to the perforations of a vertical row to be made on band 1, are attached on a part 21, integral with a support 16 which is mounted at the extremity of a slide-block 17. Support 16 is provided with a threaded rod 18, making it possible to regulate the height of the electrodes by means of screw 19.

Electrodes 15 cross a comb 22, which is provided with a groove 23 near its top and a claw 24 at its bottom, engaging, respectively, on the shoulder 14 and the lower rim of crown wheel 7. Crown wheel 7 and comb 22 are preferably of plastic material, and particularly a polyester resin, ethoxylic or epoxylic resin. Their purpose is to guide the electrodes while maintaining their separation and preventing their vibration.

Slide-block 17 can shift radially to the centrifuge body 2 in a guide-block 26 supported on frame 27 which is attached to a plate 28 mounted on the post 29 of the apparatus. This shifting can be assured by any appropriate means, for example as shown in FIG. 1, by means of a piston 30 sliding in a cylinder 31 in which a fluid under pressure may be admitted under control of a distributor 32 which may be actuated by an electromagnet 33.

The vat or tank 5 may be filled with any suitable dielectric fluid, for example, petroleum or petroleum oil.

Figure 3:
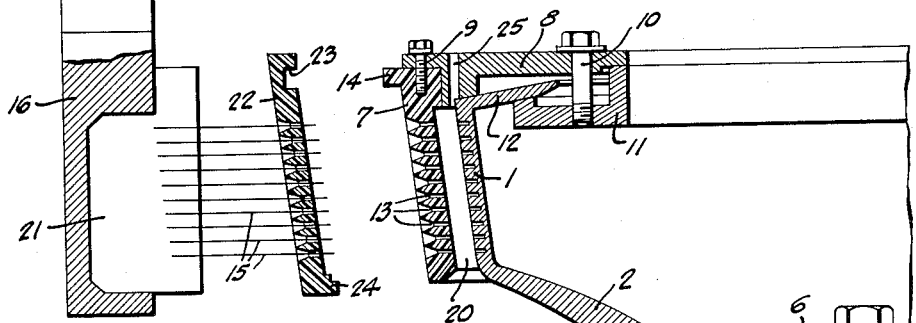
FIG. 3 is a schematic circuit diagram of the installation shown in FIGS. 1 and 2.
Figure 3:
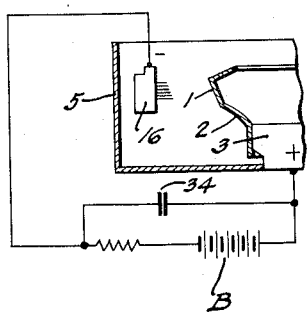

The schematic circuit diagram shown in FIG. 3 illustrates the principle of the spark being obtained by utilizing the discharge of a condenser 34 which is charged by direct current such as battery B.

The device operates as follows:

The electromagnet 33 is energized in order to control distributor 32 which brings the fluid under pressure into cylinder 31 to push piston 30 to the right. The slide-block 17, guided by guide-block 26, moves the entire electrode support 21 forward, with the electrodes 15 and comb 22 threaded on the latter. With continuance of the advancing movement, comb 22 fits onto crown wheel 7, and the tips of the electrodes enter passages 13. The tips of the electrodes then traverse the space 20 and come into contact with band 1, and, under the effect of the sparks which are produced, they begin to form holes in the band. According to the rate of advance, the length of the holes increases, and this length, as well as the diameter, are identical for all the holes formed. Before the holes are completely formed to the inner side of band 1, slide-block 17, or an organ integral therewith, acts on a contact which serves to stop the electrode support. The electromagnet 33 brings back the electrode carrier 21 and comb 22 to the starting position.

Thereafter another vertical row of blind holes is formed after having turned the vat 5 to the desired angle. In order to speed up these operations, several sparking posts may be provided symmetrically spaced around the centrifuge body, all identical with the device just described.

The blind holes thus obtained are then opened by mechanical machining from inside the band or peripheral wall.

It is advantageous, as indicated above, to give the electrodes a periodic advance and withdrawal during work, distributor 32 then acting to bring the fluid under pressure alternately on one surface and then the other of piston 30. Two or several rows of electrodes 15 may be mounted on support 16, the electrodes of these rows being arranged in a quincuncial pattern.

We claim:

1. An apparatus for producing perforations of minute and uniform diameter in a metallic workpiece, which comprises a tank adapted to contain a dielectric liquid, means for supporting said workpiece within said tank, a support for a plurality of cylindrical wire electrodes of minute and uniform diameter, a spark discharge circuit having the opposite terminals thereof connected to said support and to said workpiece, means for advancing said support towards said workpiece to generate spark discharges between the ends of said wire electrodes and said workpiece to disintegrate the metal of the workpiece at the points of said discharges, guide means of insulating material provided with apertures at displacements corresponding to the spacing between said wire electrodes for guiding the ends of said wire electrodes in their travel towards said workpiece, and means for arresting said support before the wire electrodes penetrate the workpiece completely.

2. An apparatus for producing perforations of minute and uniform diameter in the metallic peripheral wall of a centrifuge body, which comprises a tank adapted to contain a dielectric liquid, means for supporting said centrifuge body within said tank, a support for a plurality of cylindrical wire electrodes of minute and uniform diameter, a spark discharge circuit having the opposite terminals thereof connected to said support and to said centrifuge body, means for advancing said support towards said wall to generate spark discharges between the ends of said wire electrodes and the outer face of said wall to disintegrate the metal of the wall at the points of said discharges, guide means of insulating material provided with apertures at displacements corresponding to the spacing between said wire electrodes for guiding the ends of said wire electrodes in their travel towards said peripheral wall, and means for arresting said support before the wire electrodes penetrate completely the thickness of the wall, preparatory to machining the inner face of the wall to a point beyond the extent of travel of the ends of the electrodes, thereby to clear and open said perforations.

3. An apparatus as defined in claim 2 wherein said guide means comprises an annular crown surrounding the peripheral wall of the centrifuge body and affixed thereto.

4. An apparatus as set forth in claim 3 wherein the annular crown is spaced from the peripheral wall with passages at the top and bottom of the space to permit free circulation of the dielectric liquid therethrough.

5. An apparatus as defined in claim 2 wherein said guide means is formed of a polyester, ethoxylic or epoxylic resin.

6. An apparatus as set forth in claim 2 wherein said guide means comprises an apertured card of insulating material supported on the ends of said wire electrodes and movable therewith during the initial movement of said electrodes.

7. An apparatus as set forth in claim 2 wherein said guide means comprises an apertured card of insulating material supported on the ends of said wire electrodes and movable therewith during the initial movement of said electrodes, an apertured annular crown spacedly surrounding the peripheral wall of the centrifuge body and affixed thereto, and cooperating interengaging means on said card and crown for securely seating said card during the later stages of movement of said electrodes.

References Cited in the file of this patent

UNITED STATES PATENTS

| | | |
|---|---|---|
| 2,427,588 | Burnett | Sept. 16, 1947 |
| 2,438,941 | Peters | Apr. 6, 1948 |
| 2,552,582 | Peters | May 15, 1951 |
| 2,783,411 | Matulaitis | Feb. 26, 1957 |
| 2,945,936 | Carman | July 19, 1960 |